Figure 1:
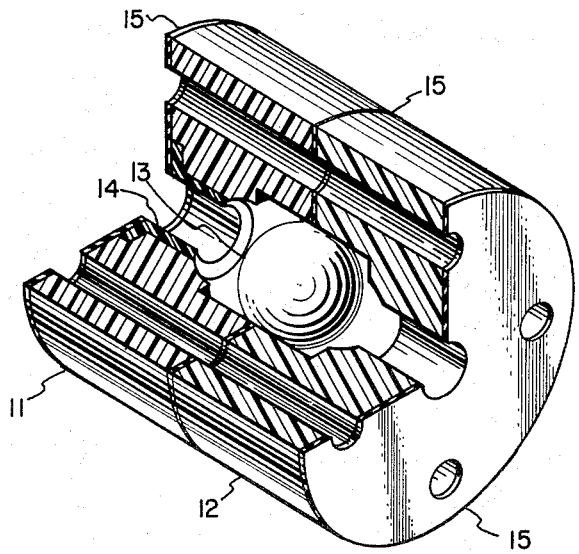

April 6, 1965     J. R. McDERMOTT ETAL     3,176,713
BALL CHECK VALVE
Filed Sept. 12, 1961

INVENTORS
JOHN R. MCDERMOTT
BY RICHARD F. MULLER, JR.

Thomas V. Sullivan

ATTORNEY

United States Patent Office 3,176,713
Patented Apr. 6, 1965

3,176,713
BALL CHECK VALVE
John R. McDermott, Luling, and Richard F. Muller, Jr., New Orleans, La., assignors to American Cyanamid Company, New York, N.Y., a corporation of Maine
Filed Sept. 12, 1961, Ser. No. 137,549
3 Claims. (Cl. 137—533.15)

This invention relates to ball check valves.

The use of ball check valves in pump equipment for the oil and chemical industries is well known. Such valves are continually subjected to many types of abrasive and corrosive materials such as sulfur, sand, acids, brine and the like. In the past, these valves have been fabricated from steel and glass and, more recently, from synthetic and natural rubber lined steel. The maximum service life of such valves is generally not longer than several months because of the deleterious influences of heat and pressure and corrosiveness of the materials being handled. Because of such abrasive and corrosive action, the valve seats, balls and housings are exposed to considerable rapid wear and must be replaced at frequent intervals causing troublesome interruption in the pumping operation and thus increasing maintenance costs.

Various plastic materials have been suggested for the manufacture of ball valves in recent years but such valves have generally embodied a different principle of operation from that of the type hereinafter more fully described in that the ball in such valve was placed in a closed or opened position by the use of a handle operated from without the housing.

We have now discovered a ball check valve having an unusual combination of co-acting parts fabricated from materials which make the valve particularly resistant to corrosion. A further advantage of the present invention is that the check valve is highly resistant to abrasion. Another advantage of this invention is that the ball is fabricated from a material having light weight thus minimizing the force of impact of the ball on the seat. A still further advantage of this invention is that the valve is capable of withstanding very high temperatures and pressures. An additional advantage of this invention is that the valve may be constructed at a low cost. As will be seen more fully from the disclosure hereinafter, we have provided a check valve which is extremely resistant to abrasion, to corrosion, to heat and to pressure.

In the practice of our invention we provide a housing consisting of ring like members which are joined throughout the length of their longitudinal axis by means of bolted flanges and the like. The axial opening of one of said ring like member is enlarged adjacent that end of said member where the same is joined to another ring like member. The ring like members are fabricated from a synthetic plastic material such as an epoxy or a polyester resin which is highly resistant to corrosion, abrasion and the like. The enlarged axial opening which is provided by molding or machining of one of the ring like members is adapted to receive a seat formed from resilient material such as natural or synthetic rubber, a polyfluorohydrocarbon resin or the like. The ball which is inserted into the axial opening provided by the ring like members before the ring like members are joined, abut or otherwise affixed, is preferably made from graphite or other light weight and corrosion resistant material. The ball is molded in approximately spherical form with a diameter slightly larger than the finished ball. The ball is then ground accurately in the spherical form to the desired dimension. The seat is formed from a resilient material and an annular spheroidal surface is provided thereon by either grinding the same in contact with an abrasive material or machining or else the surface is formed to its desired contour during the molding thereof. The finished ball and seat thus form a tight seal along the surface interface. A flat-like resilient seal or gasket is interposed between the ring like members in order to prevent leakage of the fluid being pumped through the valve.

In order that our invention may be better understood reference is made to the accompanying drawing which is for illustrative purposes only.

As shown in FIGURE 1, the housing consists of two ring like members 11 and 12 made of glass reinforced epoxy or polyester resin which are bolted between flanges (not shown) in a pipe line (also not shown). A ball 13 made of untreated graphite is allowed to move off the check valve seat 14 made of a glass-filled polyfluorohydrocarbon resin by the flow of fluid passing through the valve. As soon as the flow of fluid is interrupted for any reason, the reverse flow of fluid through the valve causes the ball to reseat and thus stop the flow. Rubber gaskets 15 are used to seal the flanged end joints as well as the center joint.

Figure 2:
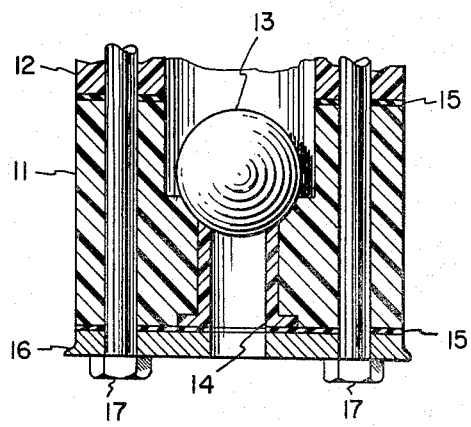

FIGURE 2 represents a partial view of the valve housing, comprising ring like members 11 and 12, bolted between flanges, here one of which is shown as 16 in a pipe line (not shown). Bolts 17 are employed to secure the valve housing to the flanges and also to join the ring like members.

The ring like members which comprise the housing are preferably fabricated from an epoxy or polyester resin which may be reinforced by having present therein fillers such as minerals, glass fibers, glass cloth, glass strands and the like. The epoxy resin, commonly designated as a bisphenolepichlorohydrin reaction product, used in the manufacture of the ring like members of the present invention is any one of those commercially available for molding or casting operations. Such resins are polymerized further with an appropriate curing agent or catalyst to form the valve housing of the present invention. Preferably, the members are prepared from an epoxy base molding material supplied either as a partially reacted molding compound or powder or as a premixed molding compound. The partially reacted molding compound may be either mineral filled or glass fibers, strands, rovings or cloth reinforced. The members may be molded by either compression or transfer molding methods and molding conditions are generally dependent upon the mold design and the degree of filler in the molding compound. The polyester resin employed is one derived from a polyhydric alcohol and a polybasic acid which is then copolymerized with a polymerizable monomer in the presence of a catalyst. It is preferable that such polyester resins be reinforced with glass, asbestos, or other fibers. The resin, reinforcement and fillers which have been premixed are introduced into a compression mold as a single charge thus filling the mold as the press closes. The resin is then cured for an appropriate time and suitable temperature and pressure. The ring like member is then removed from the mold.

Since the graphite ball constitutes the only moving part within the valve itself, it will be appreciated that malfunctioning of the valve caused by sticking of moving parts is obviated. An additional feature is that because of the fabrication of the housing in two parts the valve may be quickly disassembled for replacement of either the ball, the seat, or the seals. The use of flange joints rather than screw connections further points up the low maintenance and long life of the valve.

Valves constructed in accordance with our invention have very long life even under conditions in which a metal valve and seat or a rubber coated metal valve and seat rapidly wear away. Thus, the ball check valve of the present invention is well suited for the exacting requirements of systems handling corrosive fluids such as those encountered in the oil and chemical industry.

Extensive use of the check valve of the present invention in various applications, for example, in the handling of corrosive fluids in a chemical plant, has shown that the valve is capable of withstanding pressures up to 900 p.s.i.g. and temperatures up to 300° F. As compared with a rubber lined cast iron valve housing having a rubber covered ball, the glass-filled epoxy resin ball check valve of the present invention was able to be used for a period of time approximately six times longer than that of the former valve.

While the present invention has been described in conjunction with preferred embodiments thereof, it is understood that the description hereinbefore and accompanying drawing are to be interpreted as illustrative and not limitative. Thus, the scope of our invention is to be restricted solely by the following claims.

We claim:

1. A ball check valve comprising a housing consisting of at least two ring-like members, each having an axial opening therethrough and fabricated from a material selected from the group consisting of epoxy and polyester resins, each of said members having a face arranged to abut a corresponding face of the other of said members and arranged to be separated from each other by an axial, nonrotary movement thereof, means extending from opposite ends of said members arranged to brace and secure said members in said abutting relationship, one of said members having its axial opening enlarged adjacent that end of said member where the same abuts said other member, a resilient seat positioned within said axial opening, and a ball formed from graphite adapted to coact with said resilient seat and positioned within said axial opening.

2. A ball check valve comprising a housing consisting of at least two ring-like members, each having an axial opening therethrough and fabricated from a material selected from the group consisting of epoxy and polyester resins, each of said members having a face arranged to abut a corresponding face of the other of said members and arranged to be separated from each other by an axial, nonrotary movement thereof, means extending from opposite ends of said members arranged to brace and secure said members in said abutting relationship, one of said members having its axial opening enlarged adjacent that end of said member where the same abuts said other member, a substantially flat resilient gasket interposed between said ring-like members, a resilient seat positioned within said axial opening, and a ball formed from graphite adapted to coact with said resilient seat and positioned within said axial opening.

3. A ball check valve comprising a housing consisting of at least two ring-like members, each having an axial opening therethrough and fabricated from an epoxy resin, each of said members having a face arranged to abut a corresponding face of the other of said members and arranged to be separated from each other by an axial, nonrotary movement thereof, means extending from opposite ends of said members arranged to brace and secure said members in said abutting relationship, one of said members having its axial opening enlarged adjacent that end of said member where the same abuts said other member, a substantially flat resilient gasket interposed between said ring-like members, a resilient seat positioned within said axial opening, and a ball formed from graphite adapted to coact with said resilient seat and positioned within said axial opening.

References Cited by the Examiner

UNITED STATES PATENTS

| | | | |
|---|---|---|---|
| 391,143 | 10/88 | Hadden | 137—533.11 X |
| 1,649,235 | 11/27 | Jones | 251—368 |
| 1,756,225 | 4/30 | Wurstensen | 137—515.3 XR |
| 2,250,517 | 7/41 | Zolleis | 251—368 XR |
| 2,322,139 | 6/43 | Kaelin | 137—515.3 |
| 2,332,787 | 10/43 | Fleming | 137—533.13 |
| 2,354,255 | 7/44 | Gillum | 147—528 |
| 2,797,703 | 7/57 | Edwards | 251—368 XR |

OTHER REFERENCES

Swackhamer et al.: Epoxy Resins, Modern Plastics Encyclopedia Issue for 1956 (page 105 relied on).

Jacobs: Film, Sheet, and Shapes, Modern Plastics Encyclopedia Issue for 1960 (page 408 relied on). TP 986, A2 M5.

ISADOR WEIL, *Primary Examiner.*

MARTIN P. SCHWADRON, WILLIAM F. O'DEA,
*Examiners.*